Patented Aug. 3, 1926.

1,594,490

UNITED STATES PATENT OFFICE.

ELMER C. BERTOLET, OF PHILADELPHIA, PENNSYLVANIA, ASSIGNOR TO GEORGE K. HALE MFG. CO., OF PHILADELPHIA, PENNSYLVANIA, A CORPORATION OF PENNSYLVANIA.

METHOD OF DYEING BONE AND THE PRODUCT THEREOF.

No Drawing.    Application filed April 23, 1925. Serial No. 25,438.

My invention relates to an improved method of fast-dyeing bone, and to the product.

The object is completely to penetrate bone, and any bone article, such as a button, tiddledewink, or the like, with coloring matter.

This process consists in treating bone material and any bone article with suitable coloring matter, such as oil soluble, fat soluble, spirit soluble, insoluble azo, and basic dyes or color bases or mixtures of the same in solutions of fats, oils, or fatty acids, such for example (though not necessarily) lard oil, tallow, stearic or oleic acid.

The preferred method for most colors is to mix thoroughly the coloring matter with anywhere from 25% to 45% melted fat, oil, or fatty acid solution, and while still warm to mix about 4% coal tar distillate, and then thoroughly mix and add from about 50% to 75% of some penetrant such as organic solvent or crude petroleum oil distillates, such as naphtha of the various specific gravities, kerosene, paraffin oil, and wax, or related materials, mixtures or derivatives of the same; or coal tar distillates such as benzene, toluene, phenol, cresol or related bodies, mixtures, or derivatives of the same; or organic solvents such as ethyl, methyl, the higher alcohols, glycerol, or carbon tetrachloride.

It is possible with the varying characteristics of the dyes to omit one or more of the hereinbefore-named ingredients to obtain certain results and colors; and also the proportions vary according to coloring matter used, the particular color wanted, and the depth of shade. In fact it is possible to do this work in many different ways dependent principally on what kind of dye is used, and what particular depth of shade of color is required.

For example to make a gray, it has been necessary to use the element of fat and crude petroleum distillate, and a coal tar distillate. Stearic acid, kerosene and cresol have been used. Some shades of blue, however, can be obtained with little or no fat by using a mixture of kerosene and cresol. There are other shades that have been obtained from fat and kerosene without the cresol.

The method of dyeing is to place the material or articles to be dyed in any kind of a vessel containing the prepared solution, and allow it to stand or cook for a length of time and at a temperature which varies with depth of shade desired, the best results from most colors being to treat them for approximately thirty minutes at a temperature of from about 170° to 230° F.

The penetrant carries the color into the bone with the fat, when fat is used, and then evaporates, leaving the color and fat in the bone. The cresylic or other acid is a leveler.

The resultant product is a bone material or article completely penetrated through and through with the color, which, it is believed, has never hitherto been successfully accomplished.

I claim:—

1. The herein-described method of coloring bone material, which consists in subjecting it to a mixture of coloring matter crude petroleum oil distillate, and coal tar distillate.

2. The herein-described method of coloring bone material, which consists in subjecting it to a mixture of coloring matter, and fat and crude petroleum oil distillate.

3. The herein described method of coloring bone material, consisting in subjecting it to a mixture of coloring matter, fat, and a penetrant.

4. The herein-described method of coloring bone material, consisting in subjecting it to a mixture of coloring matter, stearic acid and a penetrant.

5. The herein-described method of coloring bone material, consisting in subjecting it to a mixture of coloring matter stearic acid and kerosene as a penetrant.

6. The herein-described method of coloring bone material, consisting in subjecting it to a mixture of coloring matter stearic acid, kerosene and cresol.

7. A bone material or product completely penetrated to a substantial depth with coloring material.

8. A bone material or product completely penetrated throughout with coloring material.

In testimony whereof I affix my signature.

ELMER C. BERTOLET.